United States Patent [19]
Carlson

[11] 3,815,871
[45] June 11, 1974

[54] HOLLOW POPPET VALVE
[75] Inventor: Glen R. Carlson, Northridge, Calif.
[73] Assignee: The Celotex Corporation, Tampa, Fla.
[22] Filed: Aug. 30, 1972
[21] Appl. No.: 285,063

[52] U.S. Cl. .............................................. 251/310
[51] Int. Cl. ............................................. F16k 5/04
[58] Field of Search ........... 251/309, 311, 310, 312, 251/121, 122, 208, 209, 210, 333, 172, 175; 285/16

[56] References Cited
UNITED STATES PATENTS

| 974,409 | 11/1910 | Matchette et al. | 251/310 |
| 2,421,479 | 6/1947 | Bunten | 251/310 X |
| 2,631,002 | 3/1953 | Mueller | 251/310 |
| 3,030,975 | 4/1962 | Mueller | 251/310 X |
| 3,276,466 | 10/1966 | Herbert | 251/310 X |
| 3,426,795 | 2/1969 | Muller | 251/310 X |
| 3,433,261 | 3/1969 | Fox | 137/608 |
| 3,467,138 | 9/1969 | Haddix et al. | 251/310 X |
| 3,540,694 | 11/1970 | Cornelius | 251/310 X |

FOREIGN PATENTS OR APPLICATIONS

| 2,026 | 12/1895 | Great Britain | 251/310 |

Primary Examiner—Henry T. Klinksiek
Attorney, Agent, or Firm—James W. Grace

[57] ABSTRACT

A hollow poppet valve is provided with a diagonal O-ring seal surrounding a hollow poppet valve stem having a sloping leading edge. The valve also has a smooth, curved lip adjacent the inner rim of the discharge passage which contacts the o-ring when the hollow poppet valve stem is rotated from a closed to open position or the reverse. A rounded groove in the face of the valve stem prevents o-ring lift-off with high velocity fluid flow.

6 Claims, 4 Drawing Figures

HOLLOW POPPET VALVE

BACKGROUND OF THE INVENTION

1. Field of the Invention

The novel rotary valve is useful for the control of the flow of fluids and is particularly useful in the control of water in water heaters.

2. Description of the Prior Art

Prior art valves of the rotary type usually have a plurality of o-rings which are used to seal the valve stem in the valve body so as to prevent leakage of the fluid or liquid whose flow through the valve is to be controlled. In most rotary valves, at least two such o-rings are required.

In addition most rotary valve stems are solid and rely upon the mechanical friction fit of the o-rings to seal the unit against leakage. Some rotary valve stems having diagonal o-rings also have a central obstruction which can impede the free flow of liquids.

It is an object of the present invention to provide a novel rotary valve which will overcome the above mentioned difficulties.

It is another object of the invention to provide a novel rotary valve in which only one o-ring is required to seal the valve against leaks.

It is yet another object of the invention to provide a novel rotary valve in which a hollow valve stem is provided to assist in compressing the o-ring to form a better seal.

It is another object of the invention to provide a novel rotary valve having a smooth, curved lip adjacent the inner rim of the outlet passage to prevent destruction of the o-ring.

Other objects and features of the invention will become apparent from the following detailed description and drawings disclosing what is presently contemplated as the best mode of the invention.

BRIEF SUMMARY OF THE INVENTION

The rotary valve of the present invention is designed to provide an unobstructed passage for fluids when open and present a complete shut-off without leakage. An o-ring is located diagonally with respect to the valve stem. The central portion of the valve stem is hollowed out so that the sides of the valve stem surrounding the hollow portion can flex outwardly under fluid pressure to assist the sealing action by the o-ring. A smooth, curved lip contacting the o-ring prevents destruction of the o-ring and prolongs its life.

DETAILED DESCRIPTION OF THE INVENTION

Figure 1:
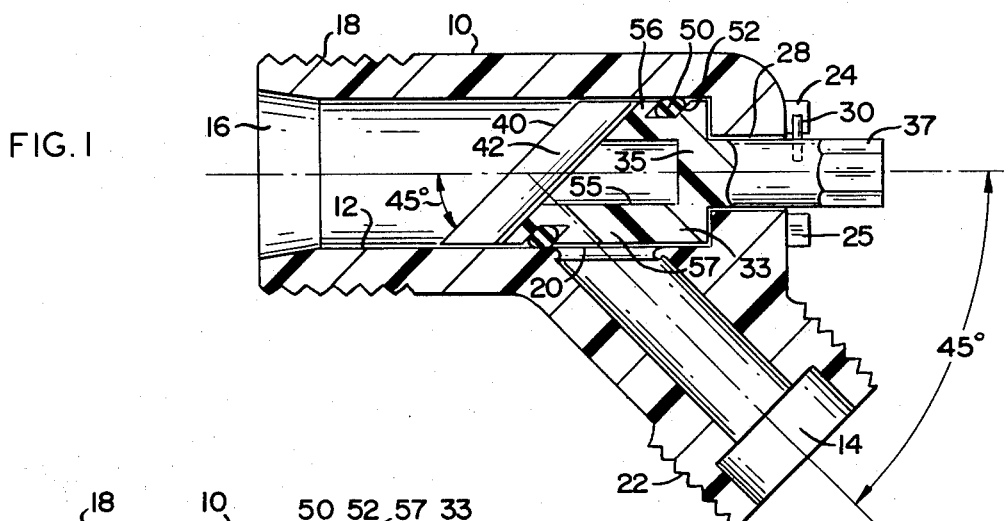
FIG. 1 is a longitudinal section through the rotary valve of the invention, with the valve in a closed position.

Referring now to the drawing and particularly FIG. 1, there is shown a valve body 10 having a fluid inlet passage 12 and a fluid outlet passage 14. Inlet passage 12 is in the form of a hollow cylindrical bore with a flared opening end 16. Around the outside of the open end of passage 12 are threads 18 which are adapted to engage a pipe or hose (not shown) which may be connected to a source of liquid. The walls of the valve may be of any material which is capable of containing the liquid to be controlled by the valve. In addition to such metal as cast iron, steel or aluminum, the valve body may be made of thermoplastic or other plastic material. Nylon or acetal resin plastics have been found to be particularly useful in this application. Acetal resins, such as those sold under the trademarks Delrin and Celcon by The Celanese Corp. of New York, N.Y. are particularly suitable.

Outlet passage 14 is also of a hollow cylindrical configuration, integrally molded with the main body of the valve and connected to the inlet passage 12 at its upper end 20. Around the outside of its lower end, outlet passage 14 has threads 22 which are adapted to engage a pipe or hose (not shown) which may be connected as a discharge from valve 10.

For convenience, the longitudinal axis of outlet passage 14 intersects the longitudinal axis of inlet passage 12 at an angle of 45°, while other angular relationships may be used, subsequent discussion will make clear the significance of this angle.

Integrally molded into the rear outer surface of the valve body are two tabs or stops 24 and 25 which are vertically aligned above and below a cylindrical shaft receiving base 28. Tabs 24 and 25 cooperate with a pin 30 to limit rotation of valve stem 33 to an arc of 180°. Valve stem 33 comprises a main body 35 integrally molded to an outwardly extending shaft 37. The outer diameter of main body 35 is slightly less than the inner diameter of inlet passage 12 and the outer diameter of shaft 37 is slightly less than the inner diameter of the cylindrical shaft receiving base 28. The spacing between the relative diameters need only be such that valve stem 33 rotates freely in its assembled position within the bore of valve 10. Pin 30 which may be molded into shaft 37 not only serves to limit rotation of valve stem 33 to an arc of 180° but also prevents valve stem 33 from moving into the base of valve body 10, a handle (not shown) can be attached to the splined outer end of shaft 37.

Valve stem 33 has a beveled front face 40 which is cut at a 45° angle with respect to its longitudinal axis. The face 40 has a rounded groove 42 cut from one edge to the other and located such that when the valve stem 33 is in its open position the inner or deepest portion of the groove 42 is aligned with the right hand wall of outlet passage 14.

Figure 2:
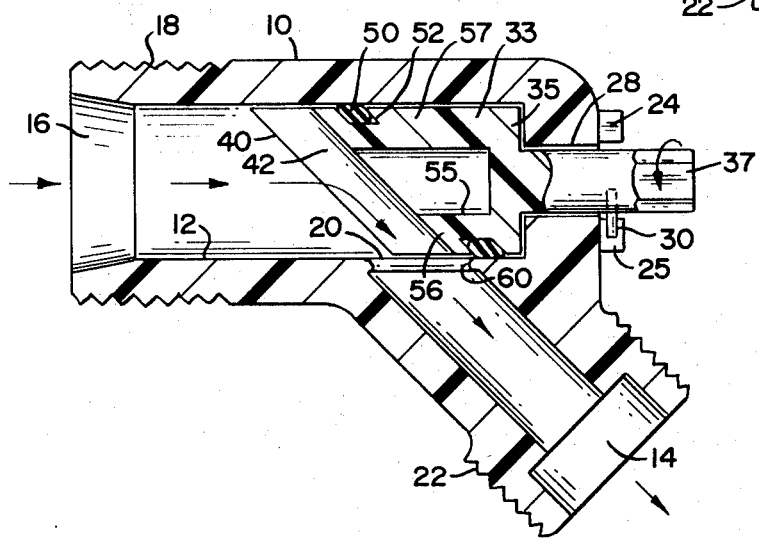
FIG. 2 is a longitudinal section through the rotary valve of the invention with the valve in an open position.

An o-ring 50 is inserted in a groove 52 cut diagonally behind and parallel to the face 40 of valve stem 33. O-ring 50 may be made of elastomeric resilient material such as rubber or neoprene. The location of o-ring 50 is such that it extends one edge of outlet passage 14 when the valve stem 33 is in its closed position (FIG. 1) and is beyond the other edge of outlet passage 14 when the valve stem 33 is in its open position (FIG. 2).

It is thus seen that in its closed position valve stem 33 with o-ring 50 effectively prevents leakage of fluid behind valve stem 33 to shut off the flow of fluid. In its open position, valve stem 33 with o-ring 50 seals off base 28 while opening a passage for fluid to outlet passage 14.

Valve stem 33 has a hollow cylindrical bore 55 which permits entrance of liquid between its walls 56 and 57 to tend to spread out those walls and further compress o-ring 50 to form a better seal in both open and closed position.

While the angle of face 40 with respect to its axis shown to be 45°, other angular relationships may be selected. The selection of the proper angle is determined by the angular relationship of the axis of outlet passage 14 and the axis of inlet passage 12. Thus, if the angle between the axis of outlet passage 14 and inlet passage 12 is changed to 30°, the angle which face 40 of valve stem 33 makes with respect to its axis and the axis of inlet passage 12 should be 30°.

Figure 3:
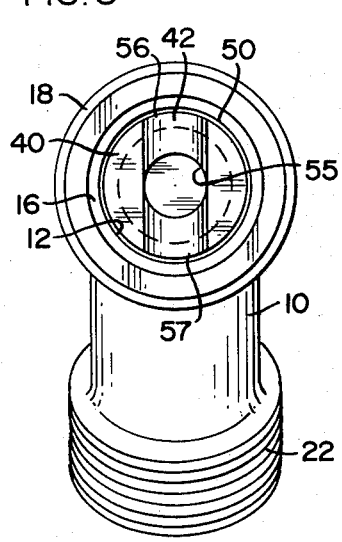
FIG. 3 is an end view of the rotary valve.

FIG. 3 shows an end elevation of the valve of the present invention taken from the left of FIG. 1 and facing the valve. The bore 55 in valve stem 33 is clearly shown as well as the grooved portion 42 of face 40.

Figure 4:
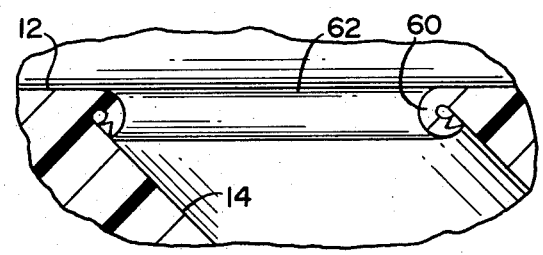
FIG. 4 is an enlarged view of a portion of the valve of FIG. 2.

FIG. 4 which is an enlarged sketch of the portion of FIGS. 1 and 2 at the junction of outlet passage 14 and inlet passage 12. The lip 60 at the rim 62 of outlet passage 14 is formed with a smooth rounded contour to present a smooth surface which o-ring 50 contacts as the valve stem 33 is rotated to open or close the valve 10.

In the molding process, the portion of the mold which forms the intersection inlet passage 12 and outlet passage 14 leaves a rounded lip 60 of plastic material overlying the inner opening of the passage 14. The smooth, rounded lip 60 presents a smooth bearing surface for o-ring 50 and prevents cutting the o-ring. If desired, lip 60 may be made smooth and round by a grinding step.

SUMMARY OF THE INVENTION

In summary there is shown a novel rotary valve having a hollow stem and a single o-ring for simple opening and closing of a fluid flow system.

I claim:

1. A rotary valve for controlling the flow of fluids comprising:

inlet and outlet passageways having longitudinal axes, a hollow poppet valve stem mounted in said inlet passageway, and rotatable between an open position and a closed position, said valve stem having a face bevelled at an angle with respect to said longitudinal axis of said inlet passageway, said valve stem having a closed hollow cylindrical bore with flexible sidewalls extending along said longitudinal axis of said inlet passageway from said face toward the rear of said valve stem:

said valve stem having a sealing member receiving groove cut therein in a plane lying at an angle with respect to said longitudinal axis of said inlet passageway and located such that said groove lies between said inlet passageway and said outlet passageway when said rotary valve is in a closed position, and said groove lies entirely outside the path of flow of said liquid from said inlet passageway to said outlet passageway when said rotary valve is in an open position, a sealing member carried in said groove and frictionally engaged said valve stem and said inlet passageway to prevent liquid flow from said inlet passageway to said outlet passageway when said valve is in its closed position and to permit unimpeded flow of liquid when said valve is in its open position, and operating means connected to said valve stem to rotate said valve stem between an open and a closed position.

2. A rotary valve as recited in claim 1 in which said face of said valve stem has a groove cut in said face and the plane of said bevel to guide the flow of the liquid from said inlet passageway to said outlet passageway.

3. A rotary valve as recited in claim 1 in which said outlet passageway has a smooth, curved rim at its junction with the inlet passageway.

4. A rotary valve as recited in claim 1 in which said operating means includes means connected to said valve and to said valve stem for limiting rotational movement of said valve stem to an arc of 180°.

5. A rotary valve as recited in claim 1 in which the angle of said bevelled face with respect to the longitudinal axis of said inlet passageway is the same as the angle of the longitudinal axis of said outlet passageway with respect to said longitudinal axis of said inlet passageway.

6. A rotary valve as recited in claim 2 in which the deepest wall of said groove is aligned with one wall of said outlet passageway when said valve is in its open position.

* * * * *